UNITED STATES PATENT OFFICE.

WILLSON H. ROWLEY, OF DETROIT, MICHIGAN.

TREATMENT OF CONIFEROUS WOODS.

942,106.

Specification of Letters Patent.   Patented Dec. 7, 1909.

No Drawing.   Application filed June 5, 1908.   Serial No. 436,962.

*To all whom it may concern:*

Be it known that I, WILLSON H. ROWLEY, a citizen of the United States, residing at Detroit, in the county of Wayne and State of Michigan, have invented certain new and useful Improvements in Treatment of Coniferous Woods, of which the following is a specification.

This invention relates to the treatment of coniferous woods, the object of the invention being the provision of an economical and effective method of treating such woods, for the recovery of valuable products and the preparation of a stock or chip susceptible of economical conversion into fiber of superior quality.

In order to prepare from coniferous woods a pure cellulose fiber suitable for the manufacture of paper, it is necessary to remove certain constituents, notably the oils, gums, resins and oleo-resins. According to my invention the removal of these is effected by the solvent action of a volatile solvent obtained from pine or other coniferous woods by methods hereinafter described, this solvent differing from commercial oil of turpentine in specific gravity, boiling point, solvent properties and other important characteristics, and being at present of unknown chemical constitution although probably containing one or more terpenes. The action of the solvent may be preceded or followed by distillation of the wood with steam. The removal of the bodies referred to leaves the wood in a porous condition which facilitates the penetration or permeation of the pulp liquors, shortens the time required for conversion into pulp, renders practicable the use of more dilute liquors, and makes possible the utilization of woods heretofore unavailable for the production of pulp or paper stock, such as different varieties of coniferous woods of high oil and resin content.

In practicing the invention I may proceed as follows: The wood is cut across the grain into chips of suitable and convenient size, ⅛ inch to ½ inch in thickness giving the best results. The chips are then placed in a suitable digester, preferably but not necessarily the same digester in which they are to be subsequently subjected to the action of any of the usual liquors for conversion into pulp. They are then subjected to the action of a volatile solvent obtained by steaming chipped pine or other coniferous wood in a digester of acceptable type for a period of time sufficient only to remove the lighter and more volatile constituents of the wood, as distinguished from the usual distillation methods which contemplate the recovery of the greatest practicable quantity of volatilizable bodies. The oily liquid and water resulting from this limited steaming are separated, and the oil preferably fractionated, the lighter fraction having a specific gravity below .855 being utilized as the solvent in subsequent operations. This volatile solvent has a specific gravity distinctly lower than that of commercial oil of turpentine, and as prepared and used by me has varied between the limits .843 and .858; its boiling point is likewise distinctly lower than that of turpentine, varying between 144° and 154° C. The solvent exhibits an acid reaction to litmus, and differs in odor and taste from commercial oil of turpentine. In use it presents very marked advantages over oil of turpentine for the extraction of resins and other constituents of coniferous woods. Oil of turpentine contains, it is well known, considerable proportions of fractions having a specific gravity above .870, and also a residue amounting usually to one or two per cent., which is not volatile with steam; it is therefore difficult if not impossible to completely remove such a solvent from the extracted wood. The present solvent on the other hand possesses no heavy fractions or non-volatile residue, and is completely and readily removable by steam. Being more mobile than oil of turpentine, it effects a more thorough penetration and a more rapid extraction of the chips. These characteristics of the solvent, and in particular the absence of constituents which are non-volatile or difficultly volatile with steam, are of the utmost importance in the extraction of wood, for the reason that the subsequent conversion of the chips into pulp or paper stock is rendered far more difficult by the presence of such constituents, entailing the use of a more concentrated sulfite or other liquor and a longer cooking period, thereby greatly weakening the fiber and depreciating its value.

The digester containing the chips is nearly filled with the volatile solvent described, the chips being completely submerged, and the solvent being preferably but not necessarily introduced at a temperature of 80° to 100° C. The contents of the digester are then heated by means of a closed steam coil or otherwise to a temperature suitable for the rapid extraction of the resins and oily matters of the wood. In practice I prefer to heat the solvent to such degree that it distils slowly from the digester, thus insuring sufficient circulation of the liquid in and among the chips. It is advisable but not necessary to maintain within the digester during this extraction a pressure somewhat below atmospheric.

In order to remove completely the oils and resinous matters the extraction should be continued with fresh portions of the volatile solvent, such portions being introduced hot, in order that the melted resins of the wood may not become chilled or solidified and thereby rendered more difficult of extraction.

After the soluble constituents of the wood have been completely extracted the liquid contents of the digester are drawn off and the wood chips are then steamed to remove and recover the remaining solvent. The enriched solvent from the digesters is fractionally distilled, whereby the volatile solvent is recovered and in addition thereto the following fractions: *a* wood turpentine, *b* wood oils, socalled, varying in specific gravity from .870 to .940 and *c* residue—rosin.

In fractionating as above a vacuum corresponding to about 20—25 inches of mercury is preferably used, closed heating coils being employed for distilling the volatile solvent, wood turpentine and the lighter wood oils, and closed coils and live steam for the heavier wood oils.

The exhausted chips remaining in the digester are then ready to receive the pulp liquors, which may comprise either caustic soda or bisulfite solutions as is well understood in the art. If desired the chips may be subjected before introduction of the pulp liquors to the action of diminished pressure to remove traces of extractive matter and solvent.

Instead of submitting the coniferous wood directly to the action of the volatile solvent as described above the process may be modified as follows: The chips are placed in the digester as before, and are subjected to the action of slightly superheated steam for a limited period, preferably about two hours, whereby the volatile solvent having a specific gravity lower than that of commercial oil of turpentine is distilled over and collected as above described. The collected solvent from this or previous operations, or the lighter fraction thereof, is then returned to the digester to submerge the partially exhausted chips therein and to complete the extraction, the conditions of operation, including repeated treatments with successive portions of the solvent, being preferably substantially as have been described with reference to the direct treatment of raw chips with the solvent. The subsequent operations, including the conversion of the exhausted chips into fiber stock, follow substantially in the manner described above.

I claim:

1. The process which consists in subjecting a coniferous wood to distillation to obtain a volatile solvent having a lower specific gravity and boiling point than commercial oil of turpentine, and then extracting soluble constituents of coniferous wood with said volatile solvent.

2. The process which consists in subjecting a coniferous wood to limited distillation with steam to obtain a volatile solvent having a lower specific gravity and boiling point than commercial oil of turpentine, and then extracting soluble constituents of coniferous wood with said volatile solvent.

3. The process which consists in subjecting a coniferous wood to distillation to obtain a volatile solvent having a lower specific gravity and boiling point than commercial oil of turpentine, extracting soluble constituents of coniferous wood with said volatile solvent, and finally converting the extracted wood into pulp or fiber stock.

4. The process which consists in subjecting a coniferous wood to limited distillation with steam to obtain a volatile solvent having a lower specific gravity and boiling point than commercial oil of turpentine, extracting soluble constituents of coniferous wood with said volatile solvent, and finally converting the extracted wood into pulp or fiber stock.

5. The process which consists in subjecting a coniferous wood to distillation with steam to obtain a volatile solvent, and then extracting soluble constituents from the partially exhausted wood with said solvent.

6. The process which consists in subjecting a coniferous wood to limited distillation with steam to obtain a volatile solvent having a lower specific gravity and boiling point than commercial oil of turpentine, and then extracting soluble constituents from the partially exhausted wood with said solvent.

7. The process which consists in subjecting a coniferous wood to distillation with steam to obtain a volatile solvent, extracting soluble constituents from the partially exhausted wood with said solvent, and finally converting the extracted wood into pulp or fiber stock.

8. The process which consists in subjecting a coniferous wood to distillation to obtain a volatile solvent and subjecting coniferous wood to repeated extractions with successive portions of said solvent.

9. The process which consists in subjecting a coniferous wood to distillation to obtain a volatile solvent, subjecting coniferous wood to repeated extractions with successive portions of said solvent, and finally converting the extracted wood into pulp or fiber stock.

10. The process which consists in subjecting a coniferous wood to limited distillation with steam to obtain a volatile solvent having a lower specific gravity and boiling point than commercial oil of turpentine, and then subjecting the partially exhausted wood to repeated extractions with successive portions of said solvent.

11. The process which consists in subjecting a coniferous wood to limited distillation with steam to obtain a volatile solvent having a lower specific gravity and boiling point than commercial oil of turpentine, subjecting the partially exhausted wood to repeated extractions with successive portions of said solvent, and finally converting the extracted wood into pulp or fiber stock.

12. The process which consists in subjecting a coniferous wood to distillation to obtain a volatile solvent having a lower specific gravity and boiling point than commercial oil of turpentine, extracting soluble constituents of coniferous wood with said volatile solvent, and fractionating the enriched solvent.

13. The process which consists in subjecting a coniferous wood to distillation to obtain a volatile solvent having a lower specific gravity and boiling point than commercial oil of turpentine, extracting soluble constituents of coniferous wood with said volatile solvent, fractionating the enriched solvent, and finally converting the extracted wood into pulp or fiber stock.

In testimony whereof, I affix my signature in presence of two witnesses.

WILLSON H. ROWLEY.

Witnesses:
WILLIAM J. GRAY,
JAS. J. MCINTYRE.